(12) United States Patent
Ohta et al.

(10) Patent No.: US 6,211,265 B1
(45) Date of Patent: Apr. 3, 2001

(54) WATER BASE INK SET FOR INK JET RECORDING

(75) Inventors: Hitoshi Ohta; Kazuhiko Kitamura, both of Suwa (JP)

(73) Assignee: Seiko Epson Corporation, Tokyo-to (JP)

( * ) Notice: Subject to any disclaimer, the term of this patent is extended or adjusted under 35 U.S.C. 154(b) by 0 days.

(21) Appl. No.: 09/212,960

(22) Filed: Dec. 16, 1998

Related U.S. Application Data

(63) Continuation of application No. PCT/JP98/01738, filed on Apr. 16, 1998.

(30) Foreign Application Priority Data

Apr. 16, 1997 (JP) ........................................................ 9-99474

(51) Int. Cl.⁷ ............................. C09D 11/10; C08L 39/02; B41J 2/01
(52) U.S. Cl. ...................... 523/160; 347/100; 106/31.43; 106/31.75
(58) Field of Search ..................................... 523/160, 161; 106/31.27, 31.28, 31.43, 31.6, 31.75; 347/100

(56) References Cited

U.S. PATENT DOCUMENTS

| | | | |
|---|---|---|---|
| 4,659,382 | 4/1987 | Kang | 106/22 |
| 4,962,190 | 10/1990 | Mayer | 534/573 |
| 5,019,164 | * 5/1991 | Tomita et al. | 106/31.43 |
| 5,223,026 | * 6/1993 | Schwarz, Jr. | 106/31.43 |
| 5,482,545 | 1/1996 | Aoki | 106/22 |
| 5,503,666 | 4/1996 | Mennicke | 106/22 K |
| 5,624,484 | 4/1997 | Takahashi | 106/31.75 |
| 5,667,572 | * 9/1997 | Taniguchi et al. | 106/31.36 |
| 5,688,311 | * 11/1997 | Adamic | 106/31.86 |
| 5,690,721 | * 11/1997 | Itoh | 106/31.13 |
| 5,746,818 | * 5/1998 | Yatake | 106/31.86 |
| 5,837,045 | * 11/1998 | Johnson et al. | 106/31.85 |
| 5,948,512 | * 9/1999 | Kubota et al. | 428/195 |

FOREIGN PATENT DOCUMENTS

| | | |
|---|---|---|
| 0434179 | 7/1990 | (EP) . |
| 63-30567 | 2/1988 | (JP) . |
| 63-33484 | 2/1988 | (JP) . |
| 1-152176 | 6/1989 | (JP) . |
| 2-80470 | 3/1990 | (JP) . |
| 2-255876 | 10/1990 | (JP) . |
| 2-296876 | 12/1990 | (JP) . |
| 7-305011 | 11/1995 | (JP) . |
| 881611 | 3/1996 | (JP) . |
| 9-109547 | 4/1997 | (JP) . |
| 9-109548 | 4/1997 | (JP) . |

* cited by examiner

Primary Examiner—Vasu Jagannathan
Assistant Examiner—Callie E. Shosho
(74) Attorney, Agent, or Firm—Ladas & Parry

(57) ABSTRACT

An ink set is disclosed which comprises at least a black ink, a yellow ink, a magenta ink, and a cyan ink, each of the inks comprising at least a colorant, a water-soluble cationic polymer having a primary amino group in its molecule, and water, the colorant consisting of a coloring material(s) classified into categories of anthraquinone, indigoid, phthalocyanine, carbonium, quinoneimine, methine, quinoline, nitro, nitroso, benzoqulnone, naphthoquinone, naphthalimide, and perinone coloring materials. This ink set can realize a full-color image having both good waterfastness and lightfastness. The coloring materials falling within the above categories, even when added, to the ink, in combination with a highly reactive polyallylamine having a primary amino group, can realize an image having good lightfastness while maintaining high waterfastness derived from the addition of the polyallylamine. Further, these colorants are not decomposed upon being attacked by the primary amino group of the polyallylamine and has excellent storage stability.

14 Claims, No Drawings

WATER BASE INK SET FOR INK JET RECORDING

This application is a continuation of PCT/JP98/01738, filed Apr. 16, 1998.

BACKGROUND OF THE INVENTION

1. Field of the Invention

The present invention relates to an ink set preferably used for ink jet recording.

2. Background Art

In ink jet recording, ink droplets are generated and ejected by static electricity-driven ejection, air pressure-driven ejection, piezoelectric device deformation-driven ejection, thermal bubble formation-driven ejection or the like and deposited onto recording paper. The water-base ink used in this method is prepared by dissolving or dispersing various dyes in water or an organic solvent.

In recent years, waterfastness on plain paper is required of the ink jet recording. In order to obtain a water-base ink that can yield an image having good waterfastness, various studies have been made on the addition of polyamines, including polyethyleneimine and modified polyethyleneimines, in combination with dyes to the ink.

For example, Japanese Patent Laid-Open No. 119280/1987 and Japanese Patent Publication No. 91495/1995 disclose, as a waterfast composition for ink jet recording, an ink containing a hydroxyethylated or hydroxypropylated polyethyleneimine and a dye component. As far as the present inventors know, however, the hydrophilicity of the polymer is so large that satisfactory waterfastness cannot be attained depending on degree of hydroxyethylation or hydroxypropylation of the polymer. This is because in the polymer of these documents about 50 to 95% by mole of the side chain is accounted for by a hydroxyethyl group or a hydroxypropyl group.

Japanese Patent Laid-Open Nos. 255876/1990, 26876/1990, and 188174/1991 disclose, as a waterfast water-base ink composition, a composition containing a polyamine, with a primary amino group, having a molecular weight of not less than 300, an anionic dye, a stability imparting agent, and a wetting agent.

Japanese Patent Laid-Open No. 305011/1995 discloses a method for imparting waterfastness to a water-base ink containing: a basic water-soluble polymer; an anion dye using a volatile base as a counter ion; and a buffer using a volatile base as a counter ion, wherein the dissociation constant of each base is regulated. In the water-base ink, when the ink is in the state of an ink liquid, the dissociation of a cationic polymer is suppressed. On the other hand, on paper, the volatile base is evaporated to allow a salt-forming reaction between the polymer and the dye to proceed, thereby imparting the waterfastness to the ink.

Japanese Patent Laid-Open No. 113743/1996 discloses, as a waterfast ink, a water-base ink containing an anion dye having an azo group, and an amino acid type polyamine or polyethyleneimine.

Further, Japanese Patent Laid-Open Nos. 167374/1989, 80470/1990, and 292275/1995 and Japanese Patent Publication Nos. 30268/1995 and 68462/1995 disclose an ink having improved waterfastness attained by using a polyamine dye prepared by combining a polyamine, such as polyethyleneimine, polyvinylamine, or polyallylamine, with an azo dye having a reactive functional group.

As far as the present inventors know, the above conventional inks can ensure given waterfastness, but on the other hand, the lightfastness is poor. In particular, in a full-color image formed using a plurality of inks, the presence of only one color having poor lightfastness results in a change in hue, which leads to extremely deteriorated quality of the color image. Thus, a higher level of lightfastness is required of the inks for a full-color image. For example, in the ink disclosed in Japanese Patent Laid-Open No. 113743/1996, utilization of a dye having a specific structure is indispensable. For this reason, the range of dyes which can be selected is so narrow that it is difficult to prepare inks having desired properties (for example, hue and density). In the inks for realizing a full-color image, it would be desirable that a wide variety of colorants could be used.

SUMMARY OF THE INVENTION

The present inventors have made studies on causes of a deterioration in lightfastness of the conventional inks. As a result, they have found that the primary amino group of the water-soluble cationic polymer contained in the ink has high reactivity, attacks the azo bond in azo dyes, and decomposes azo dyes. They have also found that the attack of the primary amino group deteriorates the storage stability of the ink.

Furthermore, the present inventors have now found that colorants having a certain structure, even when added, to the ink, in combination with a highly reactive water-soluble cationic polymer having a primary amino group, can realize an image having good lightfastness with maintaining high waterfastness derived from the addition of the polyallylamine. They have also found that these colorants are not decomposed upon being attacked by the primary amino group of the polyallylamine and has excellent storage stability. The present invention has been made based on such finding.

Accordingly, an object of the present invention is to provide an ink set that can realize a full-color image having both good waterfastness and lightfastness.

Another object of the present invention is to provide an ink set that suffers from neither discoloration nor decomposition of dyes and has good storage stability.

According to one aspect of the present invention, there is provided an ink set comprising at least a black ink, a yellow ink, a magenta ink, and a cyan ink, each of the inks comprising at least a colorant, a water-soluble cationic polymer having a primary amino group in its molecule, and water, the colorant consisting of a coloring materials) classified into categories of anthraquinone, indigoid, phthalocyanine, carbonium, quinoneimine, methine, quinoline, nitro, nitroso, benzoquinone, naphthoquinone, naphthalimide, and perinone coloring materials.

DETAILED DESCRIPTION OF THE INVENTION

Definition

As used herein, the terms "lower alkyl group" and "lower alkoxy group" refer to alkyl having 1 to 4 carbon atoms and alkoxy having 1 to 4 carbon atoms.

Ink set

The ink set according to the present invention basically comprises at least a black ink, a yellow ink, a magenta ink, and a cyan ink.

The inks of the ink set each comprise at least a colorant, a water-soluble cationic polymer having a primary amino group in its molecule, and water, the colorant consisting of a coloring material(s) classified into categories of anthraquinone, indigoid, phthalocyanine, carbonium, quinoneimine, methine, quinoline, nitro, nitroso, benzoquinone, naphthoquinone, naphthalimide, and perinone coloring materials.

The ink set according to the present invention can be used in recording methods using an ink composition. Recording methods using an ink composition include, for example, an ink jet recording method, a recording method using writing utensils, such as pens, and other various printing methods. Particularly preferably, the ink composition according to the present invention is used in ink jet recording, especially ink jet recording for forming a full-color image.

(1) Colorants

Colorants contained in the inks of the ink set according to the present invention each should fall within the above categories. Further, the colorants are in the state of dissolution or dispersion in the inks and, after printing on a recording medium, give the print on the recording medium a black color or a chromatic color. According to the present invention, any colorant (coloring material) may be utilized so far as it has the above properties. This offers an advantage that the range of selectable colorants is very broad.

Colorants falling within the above categories do not have an azo bond in their molecule and, even when added, to an ink, together with a water-soluble cationic polymer having a primary amino group in its molecule cause neither discoloration of the ink nor the decomposition of the colorants during the storage of the ink. Further, the ink containing both the colorant falling within any one of the above categories and the water-soluble cationic polymer having a primary amino group in its molecule has a great advantage that an image can be realized which possesses excellent waterfastness and excellent lightfastness. In particular, a full-color image produced by the ink set according to the present invention possesses excellent lightfastness.

According to a preferred embodiment of the present invention, the colorant is soluble in an alkali. The term "soluble in an alkali" means that the colorant is soluble in an alkaline medium. This type of colorant may be one that the water-soluble group contained in the molecule contains an acidic or basic dissociative group or a nondissociative side chain, or alternatively a plurality of types of these groups and chains. According to the present invention, the colorant may be soluble in an acidic solution so far as it is soluble in an alkali. Dissolution of the colorant in an alkali permits the colorant to have electrostatic affinity for a water-soluble cationic polymer having cationic nature.

Colorants used in the present invention are not particularly limited so far as they are color materials classified into the above categories. Preferably, however, they are selected from color materials called dyes or pigments, because pigments and dyes can provide high color density per weight and vivid colors.

Dyes are organic color materials soluble in water. Among them, dyes classified by color index into acid dyes, direct dyes, mordant dyes, reactive dyes, soluble vat dyes, sulfur dyes, or food dyes are preferred. Further, colorants, insoluble in neutral water, classified by color index into categories of oil-soluble dyes, disperse dye, and basic dyes may also be used so far as they are soluble in an aqueous alkali solution.

Examples of preferred colorants usable herein include: yellow colorants, such as C.I. Acid Yellow 1, 3, and 7, C.I. Basic Yellow 28, and C.I. Pigment Yellow 23; magenta colorants, such as C.I. Acid Red 49, 51, 52, 80, 82, 83, 87, 92, 94, and 289, C.I. Mordant Red 3, 11, 15, and 27, C.I. Sulfur Red 7, C.I. Food Red 14, and C.I. Pigment Red 81, 83, 89, and 90; cyan colorants, such as C.I. Acid Blue 1, 7, 9, 15, 22, 23, 25, 27, 40, 41, 43, 45, 54, 59, 62, 74, 78, 80, 82, 83, 90, 93, 100, 102, 103, 104, 112, 126, 127, 129, 138, 143, 182, 183, 203, 204, and 205, C.I. Direct Blue 41, 86, 106, 108, and 199, C.I. Mordant Blue 1, 8, 29, and 47, C.I. Sulfur Blue 9 and 13, C.I. Vat Blue 29, 42, and 43, C.I. Reactive Blue 1, 2, 3, 4, 5, 7, 14, 15, 17, 18, 19, 21, 25, 27, 29, 32, 37, 38, 41, 44, and 46, C.I. Solubilized Vat Blue 1, 5, and 41, C.I. Food Blue 1 and 2, C.I. Basic Blue 9, 25, and 44, and C.I. Pigment Blue 1 and 17; and black colorants, such as C.I. Acid Black 2, 48, and 50 and C.I. Mordant Black 13. These colorants may be used alone or as a mixture of two or more.

According to the present invention, the content of the colorant is preferably in the range of from 0.5 to 20% by weight based on the total amount of the ink. When the colorant content falls within the above range, the printed image has satisfactory optical density and, in addition, modification of the viscosity to a value suitable for ink jet recording can be facilitated.

(2) Water-soluble cationic polymer

The inks of the ink set according to the present invention contains a water-soluble cationic polymer having a primary amino group in its molecule. The water-soluble cationic polymer is in the state of dissolution in the water-base ink and, after printing on recording paper, serves to fix the colorant onto the recording paper to impart waterfastness to the printed image. It is considered that realization of this waterfastness is derived from the fact that the water-soluble cationic polymer has high affinity for cellulose fibers of the recording paper and consequently functions as a binder for fixing the colorant onto the recording paper.

Preferably, the water-soluble cationic polymer used in the present invention has in its molecule at least one structure selected from the group consisting of at least ethyleneimine, vinylamine, and allylamine. It is considered that the primary amino group having this structure can interact with the colorant and consequently develop good waterfastness.

A homopolymer of polyethyleneimine, polyvinylamine, or polyallylamine having a single structure of the above type may be used as the water-soluble cationic polymer. Further, besides polymers of primary amines, polymers having a primary amine in combination with a secondary, tertiary, or quaternary amino group may also be used. It is also possible to use a copolymer having at least the above structure. Examples of such copolymers include copolymers of the above monomers with acrylamide, hydroxy esters of methacrylic acid, such as hydroxyethyl methacrylate, vinylpyrrolidone, vinyl acetate, acrylic acid, maleic acid, sulfur dioxide and the like.

Commercially available water-soluble cationic polymers may also be utilized, and examples thereof include: polyethyleneimine derivatives available from Nippon Shokubai Kagaku Kogyo Co., Ltd. under tradename designations Epomin SP-003, SP-006, SP-012, SP-018, SP-103, SP-110, SP-200, and P-1000; polyvinylamine derivatives available from Mitsubishi Chemical Corporation; polyallylamine derivatives available under tradename designations PAA-L, PAA-HCl-L, PAA-10C, PAA-CH$_3$COOH-S, and PAA-D11-HCl, and polyallylamine hydrochloride derivatives available under the tradename designations Danfix 723, Danfix 202, Danfix 303, Danfix NK, Danfix F, Danfix 707, Danfix 808, Danfix T, Danfix 505RE, Danfix 5000, Danfix 7000, Danfix PAA, and Danfix HC, all of which are products of Nitto Boseki Co., Ltd.

Further, according to a preferred embodiment of the present invention, the primary amino group of the water-soluble cationic polymer is present in the side chain of the molecule, and not less than 50% by mole of the side chain in its molecule is accounted for by the primary amino group. The use of the water-soluble cationic polymer having the structure leads to the realization of a high level of waterfastness. Although the reason for this has not been elucidated yet, it is believed as follows. As compared with other side chains which are cationic, such as secondary, tertiary, and quaternary amino groups, the primary amino group of the water-soluble cationic polymer in its molecule has higher affinity for the alkali-soluble colorant and the cellulose fibers constituting the recording paper. For this reason, it is considered that the presence of the primary amino group as a side chain within the molecule of the water-soluble cationic polymer can improve the effect of the water-soluble cationic polymer as a binder between the colorant and the recording paper. Further, when the content of the primary amino group is not less than 50% by mole, the effect can be further improved. However, it should be noted that the above mechanism is merely hypothetical and the present invention should not be limited by this mechanism.

Although the content of the water-soluble cationic polymer may be suitably determined, it is preferably in the range of 0.1 to 20% by weight based on the total amount of the ink. When the content falls within the above range, the printed image has satisfactory optical density and, in addition, the viscosity can be easily modified to a value suitable for ink jet recording.

(3) Water and other ingredients of ink

In the inks of the ink set according to the present invention, water is used as a main solvent. Water is a medium for the water-base inks and functions to dissolve and hold colorants and water-soluble cationic polymer and, further, dissolution accelerators, humectants, penetration accelerators and the like which will be described later. This water may be pure water obtained by ion exchange, ultrafiltration, reverse osmosis, distillation or the like, or ultrapure water. Further, water, which has been sterilized by ultraviolet irradiation or by addition of hydrogen peroxide, is preferred because, when the ink composition is stored for a long period of time, it can prevent the growth of mold or bacteria.

According to a preferred embodiment of the present invention, the inks of the ink set according to the present invention may further comprise a water-soluble organic solvent having lower vapor pressure than pure water and a humectant selected from saccharides. The incorporation of the humectant can inhibit the vaporization of water to effectively prevent nozzle clogging of a recording head. Further, the addition of the water-soluble organic solvent permits ink droplets to be stably ejected from nozzles and, at the same time, permits the viscosity to be easily modified to a suitable value without changing the properties of the ink.

According to the present invention, the water-soluble organic solvent refers to a medium capable of dissolving the solute and is selected from organic, water-soluble solvents having a lower vapor pressure than water. Examples of preferred water-soluble organic solvents include: polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, and dipropylene glycol; ketones such as acetonylacetone; γ-butyrolactone; esters such as triethyl phosphate; and furfuryl alcohol, tetrahydrofurfuryl alcohol, and thiodiglycol. Examples of saccharides usable herein include maltitol, sorbitol, gluconic lactone, and maltose.

Preferably, the humectant is added in an amount of about 5 to 50% by weight based on the total amount of the ink.

According to a preferred embodiment of the present invention, the inks of the ink set according to the present invention further comprise a dissolution accelerator selected from the group consisting of water-soluble hydroxypyridine derivatives, water-soluble hydroxycyclic amine compounds, water-soluble chain or cyclic amide compounds, water-soluble imidazole derivatives, water-soluble azine compounds, water-soluble azole compounds, water-soluble amidine compounds, and water-soluble purine compounds. The addition of the dissolution accelerator, even when an ink jet recording apparatus is allowed to stand under extreme conditions, that is, under high temperature and low humidity conditions, for a long period of time, can effectively prevent the ink from being dried at the tip of nozzles. Further, even when drying further proceeds and, as a result, the ink is dried and solidified, the solid present in the front end of the nozzle can be redissolved in ink being supplied from the rear end of nozzles, offering an advantage that, in a short time, normal printing can be resumed. Although the reason why waterfastness can be imparted to the printed image while redissolving the ink dried and solidified at the front end of the nozzle has not been elucidated yet, it is believed as follows. When drying has proceeded at the front end of the nozzle, volatile ingredients, such as water, are evaporated to leave a mixture of the colorant, the water-soluble cationic polymer, and the water-soluble dissolution accelerator. This solid mixture produced as a result of the evaporation of volatile ingredients can be redissolved in a fresh ink. On the other hand, on the recording paper, the colorant and the water-soluble cationic polymer are adsorbed onto the cellulosic fibers and relatively present on the surface of the paper, while the water-soluble dissolution accelerator, together with the water medium, penetrates into the recording paper and hence is not locally present together with the colorant and the water-soluble cationic polymer. This results in the development of waterfastness high enough to prevent the printed image from being redissolved upon contact of the image with water.

The water-soluble hydroxypyridine derivative described above is a water-soluble compound wherein a hydroxyl group is bonded directly or through a methylene chain to a pyridine ring. Examples thereof include 2-pyridinol, 3-pyridinol, 4-pyridinol, 3-methyl-2-pyridinol, 4-methyl-2-pyridinol, 6-methyl-2-pyridinol, 2-pyridinemethanol, 3-pyridinemethanol, 4-pyridinemethanol, 2-pyridineethanol, 3-pyridineethanol, 4-pyridineethanol, 2-pyridinepropanol, 3-pyridinepropanol, 4-pyridinepropanol, α-methyl-2-pyridinemethanol, and 2,3-pyridinediol.

The water-soluble hydroxycyclic amine compound described above is a water-soluble compound which comprises a hydroxyl group bonded directly or through a methylene chain to a cyclic amine. Examples of hydroxycyclic amine compounds usable herein include 4-hydroxypiperidine, 3-hydroxypiperidine, 2-hydroxypiperidine, N-methyl-3-hyroxypiperidine, N-ethyl-3-hydroxypiperidine, N-methyl-3-hydroxymethylpiperidine, N-methyl-2-hydroxymethylpiperidine, N-(2-hydroxyethyl)piperidine, 2-(2-hydroxyethyl)piperidine, 4-(2-hydroxyethyl)piperidine, N-(2-hydroxyethyl)piperazine, N-(2-hydroxyethyl)morpholine, N-(2-hydroxypropyl)morpholine, N-(2-hydroxyethyl)pyrrole, pyrrolinol, N-(2-hydroxyethyl)pyrrolidine, N-methyl-2-(2-hydroxyethyl)pyrrolidine, N-(2-hydroxyethyl)ethyleneimine, 3-oxypyrazole, and 5-oxypyrazole.

Examples of the water-soluble chain or cyclic amide compound as described above include lactamide, methyl carbamate, ethyl carbamate, propyl carbamate, formamide, N-methylformamide, N,N-diethylformamide, N,N-dimethylformamide, acetamide, N-methylacetamide, N,N-dimethylacetamide, propionamide, N-methylpropionamide, nicotinamide, 6-aminonicotinamide, N,N-diethylnicotinamide, N-ethylnicotinamide, N-methylpyrrolidone, 5-methyl-2-pyrrolidone, 5-hydroxymethyl-2-pyrrolidone, δ-valerolactam, ε-caprolactam, heptlactam, pyroglutamic acid, N-methyl-ε-caprolactam, and β-propiolactam.

The imidazole derivative as described above is a water-soluble compound which comprises a hydroxyl group, a carboxyl group, an alkyl group or the like bonded to an imidazole ring. Examples of imidazole derivatives usable herein include imidazole, N-methylimidazole, 2-methylimidazole, 2-hydroxyimidazole, 4-hydroxyimidazole, 5-hydroxyimidazole, pyrimidazole, 2-ethylimidazole, 2-ethyl-4-methylimidazole, histamine, histidine, imidazoleacetic acid, 4-methylimidazole, 4-imidazoleacrylic acid, 4,5-imidazoledicarboxylic acid, and pilocarpine.

The water-soluble azine compound as described above is the generic name for compounds having a six-membered heterocycle which has at least two atoms selected from nitrogen, oxygen, and sulfur atoms with at least one of the atoms being nitrogen. Examples of azine compounds usable herein include pyrazine, pyrazineamide, hexahydropyrazine, 3-ethyl-2,6-dimethylpyrazine, pyrazine-2,3-dicarboxylic acid, pyrazinecarbonitrile, 2,3-pyrazinedicarbonitrile, 2,3-pyrazinecarboxyamide, 2,3-pyrazine dicarboxylic anhydride, pyrazineethanethiol, triazine, cyanuric acid, methyl cyanurate, melamine, trithiocyanuric acid, pyridazine, 4-pyridazinecarboxylic acid, cytosine, and cytosine-5-carboxylic acid.

The water-soluble azole compound as described above is the generic name for compounds having a five-membered heterocycle which has heterocycle which has at least two atoms selected from nitrogen, oxygen, and sulfur atoms with at least one of the atoms being nitrogen. Examples of azole compounds usable herein include 1,2,3-triazole, 1,2,4-triazole, 1,2,3-triazole-4,5-dicarboxylic acid, 1H-1,2,4-triazole-3-thiol, benzotriazole, benzotriazole-5-carboxylic acid, 1H-benzotriazole-1-methanol, pyrazole, tetrazole, oxazole, N1-(4,5-dimethyl-2-oxazolyl)sulfanilamide, thiazole, 2-aminothiazole, 2-thiazolecarboxyaldehyde, 5-thiazolemethanol, 1,2,3-thiadiazole, benzimidazole, benzimidazole-2-carbamic acid, (2-benzimidazolyl) acetonitrile, 5-benzimidazolecarboxylic acid, 2-benzimidazoleethanol, 2-benzimidazolepropionic acid, and 2-mercaptobenzimidazole.

The water-soluble amidine derivative as described above is the generic name for compounds having such as structure that =O of a carbonyl group in a carboxylic acid is substituted by =NH with —OH being substituted by —NH$_2$. Examples of amidine derivative usable herein include guanidine, 1-methyl-3-nitro-1-nitrosoguanidine, 1-amyl-3-nitro-1-nitrosoguanidine, nitroguanidine, sulfaguanidine, guanidinoacetic acid, guanithidine, aminoguanidine, canavanine, argininosuccinic acid, arginine, and biguanide.

The water-soluble purine derivative as described above is the generic name for compounds having in the skeleton a bicyclic heterocycle formed by condensing a pyrimidine ring with an imidazole ring. Examples of purine derivatives usable herein include purine, purineriboside, 2-amino-6-mercaptopurine, 6-(methylthio)purineriboside, 6-benzylaminopurine, xanthosine, guanine, 2-deoxyguanosine, guanosine, o-methylguanine, methylguanine, caffeine, xanthine, theophylline, theobromine, adenine, adenosine, 2-deoxyadenosine, N-benzyl-9-(2-tetrahydropyranyl)adenine, and adenosine triphosphate. These dissolution accelerators may be used alone or as a mixture of two or more.

The inks of the ink set according to the present invention may further comprise an acid. The kind of the acid is not particularly limited. However, acids having dissociation constant and water solubility suitable for adjustment of pH to a proper range are preferred. Examples thereof include: inorganic acids, such as hydrochloric acid, hydrobromic acid, nitric acid, sulfuric acid, and phosphoric acid; organic acids, for example, carboxylic acids, such as formic acid, acetic acid, propionic acid, n-butyric acid, iso-butyric acid, n-valeric acid, iso-valeric acid, caproic acid, glycolic acid, lactic acid, succinic acid, glutamic acid, adipic acid, and tartaric acid, substitution products of these carboxylic acids, or sulfonic acids corresponding to these compounds. These acids may be added to the ink either directly or as a salt of the water-soluble cationic polymer with the acid. The above acids may be used alone or as a mixture of two or more.

The inks of the ink set according to the present invention may further comprise a base. Bases usable herein include: inorganic bases, such as sodium hydroxide, potassium hydroxide, lithium hydroxide, calcium hydroxide, barium hydroxide, strontium hydroxide, radium hydroxide, beryllium hydroxide, magnesium hydroxide, and ammonia; mono-, di-, or tri-lower alkylamines, such as ethylamine, diethylamine, triethylamine, propylamine, dipropylamine, diisopropylamine, tert-butylamine, dibutylamine, duisobutylamine, isopropylamine, sec-butylamine, and pentylamine; lower alkyl lower hydroxyalkoxyamines, such as 3-ethoxypropylamine and 3-methoxypropylamine; lower alkyl lower alkoxyamines, such as 3-ethoxypropylamine and 3-methoxypropylamine; mono-, di-, or tri-lower hydroxyalkylamines, such as 2-aminoethanol, 2-(dimethylamino)ethanol, 2-(diethylamino)ethanol, diethanolamine, N-butyldiethanolamine, triethanolamine, aminomethylpropanol, and triisopropanolamine; and organic amines, such as iminobispropylamine, 3-diethylaminopropylamine, dibutylaminopropylamine, methylaminopropylamine, dimethylaminopropanediamine, and methyliminobispropylamine. These bases function to stably dissolve and hold the water-soluble cationic polymer and the colorant in the ink composition. For example, when the water-soluble cationic polymer is in the form of an acid addition salt, an alkali-soluble colorant is not often dissolved in the ink composition. Even in this case, the addition of the base can realize stable dissolution of the alkali-soluble colorant.

The inks of the ink set according to the present invention may further comprise a penetration accelerator selected from the group consisting of lower alcohols, cellosolves, carbitols, and nonionic surfactants. The penetration accelerator advantageously lowers the surface tension of the ink, accelerates the penetration of the ink into a recording medium, and shortens the drying time of the ink. Specific examples of preferred penetration accelerators usable herein include: lower alcohols such as ethanol, isopropanol, butanol, and pentanol; cellosolves such as ethylene glycol monoethyl ether and ethylene glycol monobutyl ether; carbitols such as diethylene glycol monobutyl ether and triethylene glycol monobutyl ether glycol ether; and nonionic surfactants under tradename designations Surfynol 61, 82, 104, 440, 465, and 485 available from Air Products and Chemicals, Inc., and under tradename designations Nissan Nonion K-211, K-220, P-213, E-215, E-220, S-215, S-220, HS-220, NS-212, and NS-220 available from Nippon Oils & Fats Co., Ltd.

If necessary, assistants commonly used in water-base inks for ink jet recording may be added to the inks of the ink set according to the present invention.

Examples of assistants usable herein include hydrotropy agents, pH adjustors, antimolds, chelating agents, preservatives, and rust preventives. When the ink is used in an ink jet recording method wherein the ink is charged, a specific resistance modifier selected from inorganic salts, such as lithium chloride, sodium chloride, and ammonium chloride, is added.

Hydrotropy agents usable herein include urea, alkylureas, ethyleneurea, propyleneurea, thiourea, guanidine acid salts, and tetraalkylammonium halides.

The basic materials as described above may be used also as the pH adjustor.

EXAMPLES

Preparation of Water-soluble Cationic Polymer

Synthesis Example 1

Synthesis of Polyvinylamine

N-vinylformamide (21.3 g) and 300 g of ultrapure water were placed in a 1,000-ml, four-necked flask equipped with a stirrer, a cooling tube, a nitrogen gas inlet tube, and a reagent inlet, followed by dissolution with stirring. The temperature of the solution was raised to 50° C. while introducing a nitrogen gas, 100 g of a 10 wt % aqueous 2,2'-azobis-(2-amidinopropane) dihydrochloride solution was added to the solution, and the solution was then kept at 50° C. under a nitrogen gas stream with stirring for 8 hr, followed by purification and drying to give poly(N-vinylformamide).

The whole quantity of the resultant poly(N-vinylformamide) and 400 ml of ultrapure water were placed in a 2,000-ml, four-necked flask equipped with a stirrer, a cooling tube, a nitrogen gas inlet tube, and a reagent inlet, followed by dissolution with stirring. The solution was mixed with stirring while gradually adding 400 ml of a 1 N aqueous hydrochloric solution dropwise to the solution, followed by mixing with stirring for one hr. The temperature of the flask was raised to 100° C., and the system was mixed with stirring for 10 hr while maintaining the temperature at 100° C. After the completion of the reaction, the system was cooled, followed by purification and drying to give a polyvinylamine hydrochloride.

The polyvinylamine hydrochloride was dissolved in ultrapure water to prepare a 10 wt % aqueous solution. The aqueous solution was passed through an ion exchange resin IRA 900 (tradename, manufactured by Organo Corp.), which has previously been ion-exchanged with sodium hydroxide to remove hydrochloric acid, and then dried to give a free-type polyvinylamine. The molecular weight of the free-type polyvinylamine was measured by gel permeation chromatography using polyethylene glycol as a standard and found to be about 2,000.

Synthesis Example 2

A polyvinylamine was prepared in the same manner as in Synthesis Example 1, except that the 10 wt % aqueous 2,2'-azobis-(2-amidinopropane) dihydrochloride solution was used in an amount of 40 g. The molecular weight of the polyvinylamine thus prepared was measured by gel permeation chromatography using polyethylene glycol as a standard and found to be about 5,000.

Preparation of ink sets

Example 1

Ink Set 1

Ink set 1 comprising the following black ink 1, yellow ink 1, magenta ink 1, and cyan ink 1 was prepared.

(1) Black ink 1

Suminol Fast Gray 3G (tradename, manufactured by Sumitomo Chemical Co., Ltd., C.I. Acid Black 48), an anthraquinone colorant, was dissolved in an amount of 5 g in 50 g of ultrapure water to prepare a dye solution. The polyvinylamine (3 g) having a molecular weight of about 2,000 synthesized in Synthesis Example 1 was added as a water-soluble cationic polymer to the dye solution with stirring, and, in addition, ultrapure water was added thereto to a total solution weight of 100 g, followed by stirring. The solution was then passed through a metal mesh filter having a pore diameter of about 5 µm to prepare black ink 1.

(2) Yellow ink 1

Solar Pure Yellow 8G (tradename, manufactured by Sumitomo Chemical Co., Ltd., C.I. Acid Yellow 7), a naphthalimide colorant, was dissolved in an amount of 2.5 g in 50 g of ultrapure water to prepare a dye solution. Polyallylamine PAA-10C (tradename, manufactured by Nitto Boseki Co., Ltd.) (1.5% by weight on a solid basis) and ultrapure water were added as a water-soluble cationic polymer to the dye solution with stirring, and, in addition, ultrapure water was added thereto to a total solution weight of 100 g, followed by stirring. The solution was then passed through a metal mesh filter having a pore diameter of about 5 µm to prepare yellow ink 1.

(3) Magenta ink 1

Dye Acid Alizarin Rubinol F3G 200% (tradename, manufactured by Mitsubishi Chemical Corporation, C.I. Acid Red 82), an anthraquinone colorant, was dissolved in an amount of 2 g in 50 g of ultrapure water to prepare a dye solution. Polyethyleneimine SP-012 (tradename, manufactured by Nippon Shokubai Kagaku Kogyo Co., Ltd.) (4 g) was added as a water-soluble cationic polymer to the dye solution with stirring, and, in addition, ultrapure water was added thereto to a total solution weight of 100 g, followed by stirring. The solution was then passed through a metal mesh filter having a pore diameter of about 5 µm to prepare magenta ink 1.

(4) Cyan ink 1

Kayarus Turquoise Blue GL (tradename, manufactured by Nippon Kayaku Co., Ltd., C.I. Direct Blue 86), a phthalocyanine colorant, was dissolved in an amount of 4 g in 50 g of ultrapure water to prepare a dye solution. Danfix 505RE (tradename, manufactured by Nitto Boseki Co., Ltd.), a polyallylamine hydrochloride derivative, was added as a water-soluble cationic polymer in an amount of 0.2% by weight on a solid basis to the dye solution with stirring, and, in addition, ultrapure water was added thereto to a total solution weight of 100 g, followed by stirring. The solution was then passed through a metal mesh filter having a pore diameter of about 5 µm to prepare cyan ink 1.

Example 2

Ink Set 2

Ink set 2 comprising the following black ink 2, yellow ink 2, magenta ink 2, and cyan ink 2 was prepared.

(1) Black ink 2

Nigrosine NB (tradename, manufactured by Sumitomo Chemical Co., Ltd., C.I. Acid Black 2), a quinoneimine colorant, was dissolved in an amount of 3 g in 50 g of ultrapure water to prepare a dye solution. The polyvinylamine (3 g) having a molecular weight of about 2,000 synthesized in Synthesis Example 1 was added as a water-soluble cationic polymer to the dye solution with stirring, and, in addition, ultrapure water was added thereto to a total solution weight of 100 g, followed by stirring. The solution was then passed through a metal mesh filter having a pore diameter of about 5 μm to prepare black ink 2.

(2) Yellow ink 2

Astrazon Golden Yellow GL (tradename, manufactured by Bayer, C.I. Basic Yellow 28), a methane colorant, was dissolved in an amount of 3.5 g in 50 g of ultrapure water to prepare a dye solution. The polyvinylamine (1.5 g) having a molecular weight of about 2,000 synthesized in Synthesis Example 1 was added as a water-soluble cationic polymer to the dye solution with stirring, and, in addition, ultrapure water was added thereto to a total solution weight of 100 g, followed by stirring. The solution was then passed through a metal mesh filter having a pore diameter of about 5 μm to prepare yellow ink 2.

(3) Cyan ink 2

Sumifix Brilliant Blue R (tradename, manufactured by Sumitomo Chemical Co., Ltd., C.I. Reactive Blue 19), an anthraquinone colorant, was dissolved in an amount of 2 g in 50 g of ultrapure water to prepare a dye solution. Polyallylamine PAA-L (tradename, manufactured by Nitto Boseki Co., Ltd.) was added as a water-soluble cationic polymer in an amount of 2.5% by weight on a solid basis to the dye solution with stirring, and, in addition, ultrapure water was added thereto to a total solution weight of 100 g, followed by stirring. The solution was then passed through a metal mesh filter having a pore diameter of about 5 μm to prepare cyan ink 2.

(4) Magenta ink 2

Pink 6G (tradename, manufactured by Noma Kagaku Kogyo K.K., C.I. Pigment Red 81), a carbonium colorant, was added in an amount of 2.5 g to 50 g of ultrapure water. Danfix 723 (tradename, manufactured by Nitto Boseki Co., Ltd.), a polyallylamine hydrochloride, was added as a water-soluble cationic polymer in an amount of 2.5% by weight on a solid basis. Thereafter, 1.2 g of sodium hydroxide was further added, and ultrapure water was added thereto to a total weight of 100 g, followed by stirring. The mixture was then passed through a metal mesh filter having a pore diameter of about 5 μm to prepare magenta ink 2.

Example 3

Ink Set 3

Ink set 3 comprising the following black ink 3, yellow ink 3, magenta ink 3, and cyan ink 3 was prepared.

(1) Black ink 3

Suminol Fast Gray 3G (tradename, manufactured by Sumitomo Chemical Co., Ltd., C.I. Acid Black 48), an anthraquinone colorant, was dissolved in an amount of 5 g in 50 g of ultrapure water to prepare a dye solution. PAA-D41-HCl (tradename, manufactured by Nitto Boseki Co., Ltd.), a polyallylamine hydrochloride derivative, was added as a water-soluble cationic polymer in an amount of 0.2% by weight on a solid basis to the dye solution with stirring. Thereafter, 0.5 g of sodium hydroxide was further added thereto. Ultrapure water was added thereto to a total solution weight of 100 g, followed by stirring. The solution was then passed through a metal mesh filter having a pore diameter of about 5 μm to prepare black ink 3.

(2) Yellow ink 3

Daiwa Naphthol Yellow S (tradename, manufactured by Daiwa Senryo Seizo K.K., C.I. Acid Yellow 1), a nitro colorant, was dissolved in an amount of 3 g in 50 g of ultrapure water to prepare a dye solution. Epomin SP-003 (tradename, manufactured by Nippon Shokubai Kagaku Kogyo Co., Ltd.), a polyethyleneimine, was added as a water-soluble cationic polymer in an amount of 5 g to the dye solution with stirring, and, in addition, ultrapure water was added thereto to a total solution weight of 100 g, followed by stirring. The solution was then passed through a metal mesh filter having a pore diameter of about 5 μm to prepare yellow ink 3.

(3) Cyan ink 3

Kayanol Blue AGG (tradename, manufactured by Nippon Kayaku Co., Ltd., C.I. Acid Blue 40), an anthraquinone colorant, was dissolved in an amount of 2.5 g in 50 g of ultrapure water to prepare a dye solution. Danfix 723 (tradename, manufactured by Nitto Boseki Co., Ltd.), a polyallylamine hydrochloride, was added as a water-soluble cationic polymer in an amount of 2% by weight on a solid basis to the dye solution with stirring. Thereafter, 0.7 g of potassium hydroxide was further added, and ultrapure water was added thereto to a total solution weight of 100 g, followed by stirring. The solution was then passed through a metal mesh filter having a pore diameter of about 5 μm to prepare cyan ink 3.

(4) Magenta ink 3

Aizen Acid Rhodamine FB (tradename, manufactured by Nippon Kayaku Co., Ltd., C.I. Acid Red 52), a carbonium colorant, was dissolved in an amount of 2.5 g in 50 g of ultrapure water to prepare a dye solution. PAA-L (tradename, manufactured by Nitto Boseki Co., Ltd.), a polyallylamine, was added as a water-soluble cationic polymer in an amount of 2% by weight on a solid basis to the dye solution with stirring. 1 N hydrochloric acid (0.1 g) was further added as an acid. Ultrapure water was added thereto to a total solution weight of 100 g, followed by stirring. The solution was then passed through a metal mesh filter having a pore diameter of about 5 μm to prepare magenta ink 3.

Example 4

Ink Set 4

Ink set 4 comprising the following black ink 4, yellow ink 4, magenta ink 4, and cyan ink 4 was prepared.

(1) Black ink 4

Black ink 4 was prepared in the same manner as described above in connection with black ink 3 in Example 3, except that 10 g of maltitol was added as a humectant.

(2) Yellow ink 4

Yellow ink 4 was prepared in the same manner as described above in connection with yellow ink 1 in Example 1, except that 10 g of glycerin was added as a humectant.

(3) Magenta ink 4

Magenta ink 4 was prepared in the same manner as described above in connection with magenta ink 1 in Example 1, except that 10 g of thioglycol was added as a humectant.

(4) Cyan ink 4

Cyan ink 4 was prepared in the same manner as described above in connection with cyan ink 2 in Example 2, except that 10 g of acetonylacetone was added as a humectant.

Example 5

Ink set 5

Ink set 5 comprising the following black ink 5, yellow ink 5, magenta ink 5, and cyan ink 5 was prepared.

(1) Black ink 5

Black ink 5 was prepared in the same manner as described above in connection with black ink 1 in Example 1, except that 10 g of 2-pyridinol, a hydroxypyridine derivative, was added as a dissolution accelerator.

(2) Yellow ink 5

Yellow ink 5 was prepared in the same manner as described above in connection with yellow ink 1 in Example 1, except that 15 g of N-methyl-3-hydroxypyridine, a hydroxycyclic amine compound, was added as a dissolution accelerator.

(3) Magenta ink 5

Magenta ink 5 was prepared in the same manner as described above in connection with magenta ink 1 in Example 1, except that 5 g of $\epsilon$-caprolactam, a cyclic amide compound, was added as a dissolution accelerator.

(4) Cyan ink 5

Cyan ink 5 was prepared in the same manner as described above in connection with cyan ink 1 in Example 1, except that 15 g of imidazole, an imidazole derivative, was added as a dissolution accelerator.

Example 6

Ink set 6

Ink set 6 comprising the following black ink 6, yellow ink 6, magenta ink 6, and cyan ink 6 was prepared.

(1) Black ink 6

Black ink 6 was prepared in the same manner as described above in connection with black ink 1 in Example 1, except that the amount of Suminol Fast Gray 3G was changed to 0.5 g and the amount of the polyvinylamine having a molecular weight of about 2,000 synthesized in Synthesis Example 1 was changed to 0.3 g.

(2) Yellow ink 6

Yellow ink 6 was prepared in the same manner as described above in connection with yellow ink 1 in Example 1, except that the amount of Solar Pure Yellow 8G was changed to 10 g, the water-soluble cationic polymer was changed to 5% by weight on a solid basis of polyallylamine PAA-10C (tradename, manufactured by Nitto Boseki Co., Ltd.), and, in addition, 2.5% by weight on a solid basis of Danfix 723 (tradename, manufactured by Nitto Boseki Co., Ltd.), a polyallylamine hydrochloride, was added.

(3) Magenta ink 6

Magenta ink 6 was prepared in the same manner as described above in connection with magenta ink 1 in Example 1, except that 20 g of imidazole was added, the amount of Dye Acid Alizarin Rubinol F3G 200% was change to 20 g, and the water-soluble cationic polymer was changed to 0.5% by weight on a solid basis of Danfix 505RE (tradename, manufactured by Nitto Boseki Co., Ltd.), a polyallylamine hydrochloride derivative.

(4) Cyan ink 6

Cyan ink 6 was prepared In the same manner as described above in connection with cyan ink 1 in Example. 1, except that the amount of Kayarus Turquoise Blue GL was changed to 0.5 g and the water-soluble cationic polymer was changed to 1 g of SP-012 (tradename, manufactured by Nippon Shokubai Kagaku Kogyo Co., Ltd.), a polyethyleneimine.

Example 7

Ink set 7

Ink set 7 comprising the following black ink 7, yellow ink 7, magenta ink 7, and cyan ink 7 was prepared.

(1) Black ink 7

Black ink 7 was prepared in the same manner as described above in connection with black ink 7 in Example 1, except that the amount of Suminol Fast Gray 3G was changed to 0.5 g, the water-soluble cationic polymer was changed to 0.5% by weight on a solid basis of PAA-10C (tradename, manufactured by Nitto Boseki Co., Ltd.), a polyallylamine, and 2 g of 2-(dimethylamino)ethanol was further added.

(2) Yellow ink 7

Yellow ink 7 was prepared in the same manner as described above in connection with yellow ink 1 in Example 1, except that the amount of Solar Pure Yellow 8G was changed to 15 g, the water-soluble cationic polymer was changed to 10% by weight on a solid basis of Danfix 723 (tradename, manufactured by Nitto Boseki Co., Ltd.), a polyallylamine hydrochloride, and 5 g of potassium hydroxide was further added.

(3) Magenta ink 7

Magenta ink 7 was prepared in the same manner as described above in connection with magenta ink 1 in Example 1, except that the amount of ultrapure water to be initially charged was changed to 30 g, 30 g of imidazole, an imidazole derivative, was added as a dissolution accelerator, the amount of Dye Acid Alizarin Rubinol F3G 200% was change to 10 g, and the water-soluble cationic polymer was changed to 20 g of Epomin SP-003 (tradename, manufactured by Nippon Shokubai Kagaku Kogyo Co., Ltd.). a polyethyleneimine.

(4) Cyan ink 7

Cyan ink 7 was prepared in the same manner as described above in connection with cyan ink 1 in Example 1, except that the amount of Kayarus Turquoise Blue GL (tradename, manufactured by Nippon Kayaku Co., Ltd., C.I. Direct Blue 86) was changed to 2 g and the amount of Danfix 505RE (tradename, manufactured by Nitto Boseki Co., Ltd.), a polyallylamine hydrochloride derivative, as the water-soluble cationic polymer was changed to 0.1% by weight on a solid basis.

Example 8

Ink set 8

Ink set 8 comprising the following black ink 8, yellow ink 8, magenta ink 8, and cyan ink 8 was prepared.

(1) Black ink 8

Black ink 8 was prepared in the same manner as described above in connection with black ink 1 in Example 1, except that the amount of Suminol Fast Gray 3G was changed to 4 g, the water-soluble cationic polymer was changed to 2.5% by weight on a solid basis of Danfix 723 (tradename, manufactured by Nitto Boseki Co., Ltd.), a polyallylamine hydrochloride, and, in addition, 1 g of potassium hydroxide, 5 g of 2-(dimethylamino)ethanol, and 10 g of diethylene glycol monobutyl ether as a penetration accelerator were added.

(2) Yellow ink 8

Yellow ink 8 was prepared in the same manner as described above in connection with yellow ink 1 in Example 1, except that 4 g of 2-(dimethylamino)ethanol and 0.8 g of Surfynol 465 (tradename, manufactured by Air Products and Chemicals, Inc.), a nonionic surfactant, as a penetration accelerator were added.

(3) Magenta ink 8

Magenta ink 8 was prepared in the same manner as described above in connection with magenta ink 1 in Example 1, except that the amount of ultrapure water to be initially charged was changed to 30 g, the water-soluble cationic polymer was changed to 3 g of Epomin SP-006 (tradename, manufactured by Nippon Shokubai Kagaku Kogyo Co., Ltd.), a polyethyleneimine derivative, and, in addition, 10 g of glycerin as a humectant and 10 g of diethylene glycol monobutyl ether and 0.8 g of Surfynol 465 (tradename, manufactured by Air Products and Chemicals, Inc.), a nonionic surfactant, as penetration accelerators were added.

(4) Cyan ink 8

Cyan ink 8 was prepared in the same manner as described above in connection with cyan ink 1 in Example 1, except that the amount of ultrapure water to be initially charged was changed to 30 g, the water-soluble cationic polymer was changed to 2% by weight on a solid basis of PAA-10C (tradename, manufactured by Nitto Boseki Co., Ltd.), a polyallylamine, and, in addition, 20 g of imidazole as a dissolution accelerator, 10 g of diethylene glycol as a humectant, and 10 g of triethylene glycol monobutyl ether and 0.8 g of Surfynol 465 (tradename, manufactured by Air Products and Chemicals, Inc.), a nonionic surfactant, as penetration accelerators were added.

Comparative Example 1

Ink Set 9

Ink set 9 comprising the following black ink 9, yellow ink 9, magenta ink 9, and cyan ink 9 was prepared.

(1) Black ink 9

Black ink 9 was prepared in the same manner as described above in connection with magenta ink 1 in Example 1, except that the colorant was changed to Direct Fast Black B (tradename, manufactured by Sumitomo Chemical Co., Ltd., C.I. Direct Black 22), an azo dye.

(2) Yellow ink 9

Yellow ink 9 was prepared in the same manner as described above in connection with magenta ink 1 in Example 1, except that the colorant was changed to Aizen Opal Yellow 3GH (tradename, manufactured by Hodogaya Chemical Co., Ltd., C.I. Acid Yellow 98), an azo dye.

(3) Magenta ink 9

Magenta ink 9 was prepared in the same manner as described above in connection with magenta ink 1 in Example 1, except that the colorant was changed to Sanchromine Red G Conc (tradename, manufactured by Sumitomo Chemical Co., Ltd., C.I. Mordant Red 17), an azo dye.

(4) Cyan ink 9

Cyan ink 9 was prepared in the same manner as described above in connection with magenta ink 1 in Example 1, except that the colorant was changed to Kayanol Milling Cyanin 5R (tradename, manufactured by Nippon Kayaku Co., Ltd., C.I. Acid Blue 113), an azo dye.

Comparative Example 2

Ink Set 10

Ink set 10 comprising magenta ink 9 prepared in Comparative Example 1 and black ink 1, yellow ink 1, and cyan ink 1 prepared in Example 1 was prepared.

Comparative Example 3

Ink Set 11

Black ink 11, yellow ink 11, magenta ink 11, and cyan ink 11 were prepared in the same manner as described above in connection with black ink 1, yellow ink 1, magenta ink 1, and cyan ink 1 in Example 1, except that the water-soluble cationic polymer was changed to ultrapure water.

Evaluation test on inks (1) Waterfastness

Each of the ink sets prepared in the above examples and comparative examples were loaded into an ink jet recording printer MJ-5000C (tradename, manufactured by Seiko Epson Corporation), and a full-color image was printed on Xerox-P (tradename, manufactured by Fuji Xerox Co., Ltd.) as neutral plain paper, EPP (tradename, manufactured by Seiko Epson Corporation) as acidic plain paper, and Xerox-R (tradename, manufactured by Fuji Xerox Co., Ltd.) as recycled paper. The prints were allowed to stand for one hr and then evaluated for waterfastness according to a water spotting test set forth in JIS L 0853. Specifically, one drop of water was put on the printed area and allowed to stand until the print dried. The waterfastness was evaluated in terms of a color change (fading) on the printed area. The evaluation criteria were as follows.

A: No color change for all the recording papers

B: A color change of less than 15% for at least one of the recording papers

C: A color change of 15 to 50% for at least one of the recording papers

D: A color change exceeding 50% for at least one of the recording papers (2) Lightfastness The prints as used in the waterfastness test (1) was exposed for one day by means of a xenon weatherometer Ci35W (tradename, manufactured by Atlas Electric Device). The O.D. value of the prints was measured before and after the exposure with a color control system SPM 50 (tradename, manufactured by Gretag). The results were evaluated according to the following criteria.

A: A color change of less than 5% in terms of O.D. value for at least one of the recording papers B: A color change of 5 to 20% in terms of O.D. value for at least one of the recording papers C: A color change exceeding 20% in terms of O.D. value for at least one of the recording papers (3) Storage stability of ink The inks of the ink set prepared in the above examples and comparative examples were placed in a sample bottle made of glass and allowed to stand at 60° C. for one week and at −30° C. for one week. Before and after the test, the λmax value of the inks was measured with an instantaneous multi-photometric system MCPD-1000 (tradename, manufactured by Otsuka Denshi K.K). The results were evaluated according to the following criteria.

A: No change in λmax value

B: A change in λmax value of ±less than 1 nm

C: A change in λmax value of ±1 nm to ±10 nm

D: A change in λmax value exceeding ±10 nm for at least one of the inks.

The results of evaluation were as summarized in the following table. In the table, for the storage stability, the results of evaluation for the maximum value and the minimum value are shown.

| Example | Water-fastness | Light-fastness | Storage stability |
|---|---|---|---|
| 1 | A | A | A-C |
| 2 | B | B | A-B |
| 3 | A | B | A-B |
| 4 | A | A | A-B |
| 5 | A | A | A-B |
| 6 | A | B | A-B |
| 7 | B | B | A-B |
| 8 | A | A | A-B |

| Comparative Example | | | |
|---|---|---|---|
| 1 | A | C | D |
| 2 | A | C | A-D |
| 3 | D | A | A |

(4) Printing stability

The ink set 5 was loaded into an ink jet recording printer MJ-5000C and then allowed to stand with the print head being deviated from the home position under high temperature and low humidity environment (40° C./25%RH) for 2 weeks. Thereafter, the cleaning operation was executed until printing could be normally performed. As a result, for all the inks, the number of cleaning operations necessary for return to the normal printing was 5 or less.

(5) Quick-drying

Ink set 8 was loaded into an ink jet recording printer MJ-5000C, and blotted images were printed on Xerox-P (tradename, manufactured by Fuji Xerox Co., Ltd.) as neutral plain paper, EPP (tradename, manufactured by Seiko Epson Corporation) as acidic plain paper, and Xerox-R (tradename, manufactured by Fuji Xerox Co., Ltd.) as recycled paper. As a result, for all the inks, the drying time taken for a gloss of the liquid on the paper to disappear was less than 2 sec.

What is claimed is:

1. An ink set comprising at least a black ink, a yellow ink, a magenta ink, and a cyan ink,
   each of the inks comprising at least a colorant, a water-soluble cationic polymer having a primary amino group, and water, the colorant consisting of a coloring material(s) selected from the group consisting of anthraquinone, indigoid, phthalocyanine, carbonium, quinoneimine, methine, quinoline, nitro, nitroso, benzoquinone, naphthoquinone, naphthalimide, and perinone coloring materials.

2. The ink set according to claim 1, wherein the colorant is soluble in an alkali and classified into the category of a dye or a pigment.

3. The ink set according to claim 1, wherein the water-soluble cationic polymer has a side chain with not less than 50% by mole of the side chain being a primary amino group.

4. The ink set according to claim 1, wherein the water-soluble cationic polymer is formed by polymerizing at least one monomer selected from the group consisting of ethyleneimine, vinylamine, and allylamine.

5. The ink set according to claim 1, wherein the ink further comprises a water-soluble organic solvent having a lower vapor pressure than pure water and/or a humectant selected from saccharides.

6. The ink set according to claim 1, wherein the ink further comprises a dissolution accelerator selected from the group consisting of water-soluble hydroxypyridine derivatives, water-soluble hydroxycyclic amine compounds, water-soluble chain or cyclic amide compounds, water-soluble imidazole derivatives, water-soluble azine compounds, water-soluble azole compounds, water-soluble amidine compounds, and water-soluble purine compounds.

7. The ink set according to claim 1, wherein the ink further comprises an acid.

8. The ink set according to claim 1, wherein the ink further comprises a base.

9. The ink set according to claim 1, wherein the colorant is contained in an amount of 0.5 to 20% by weight based on the total amount of the ink.

10. The ink set according to claim 1, wherein the water-soluble cationic polymer is contained in an amount of 0.1 to 20% by weight based on the total amount of the ink.

11. The ink set according to claim 1, wherein the ink further comprises a penetration accelerator selected from the group consisting of lower alcohols, cellosolves, carbitols, and nonionic surfactants.

12. A recording method comprising the step of depositing an ink composition onto a recording medium to perform printing on the recording medium, wherein ink compositions in the ink set according to claim 1, are used as the ink composition to form a full-color image.

13. A recording medium recorded by the recording method according to claim 12.

14. An ink jet recording method comprising the step of ejecting droplets of an ink composition; and depositing the ink droplets onto a recording medium to perform printing on the recording medium, wherein ink compositions in the ink set according to claim 1 are used as the ink composition to form a full-color image.

* * * * *